No. 698,643.  
T. DUNCAN.  
ELECTRIC METER.  
(Application filed Aug. 24, 1898.)  
Patented Apr. 29, 1902.

(No Model.)

2 Sheets—Sheet 1.

Witnesses  
Samuel A. Buchtel  
Adelaide Kearne

Thomas Duncan Inventor  
By his Attorneys Chapin & Denny

No. 698,643. Patented Apr. 29, 1902.
T. DUNCAN.
ELECTRIC METER.
(Application filed Aug. 24, 1898.)
(No Model.) 2 Sheets—Sheet 2.
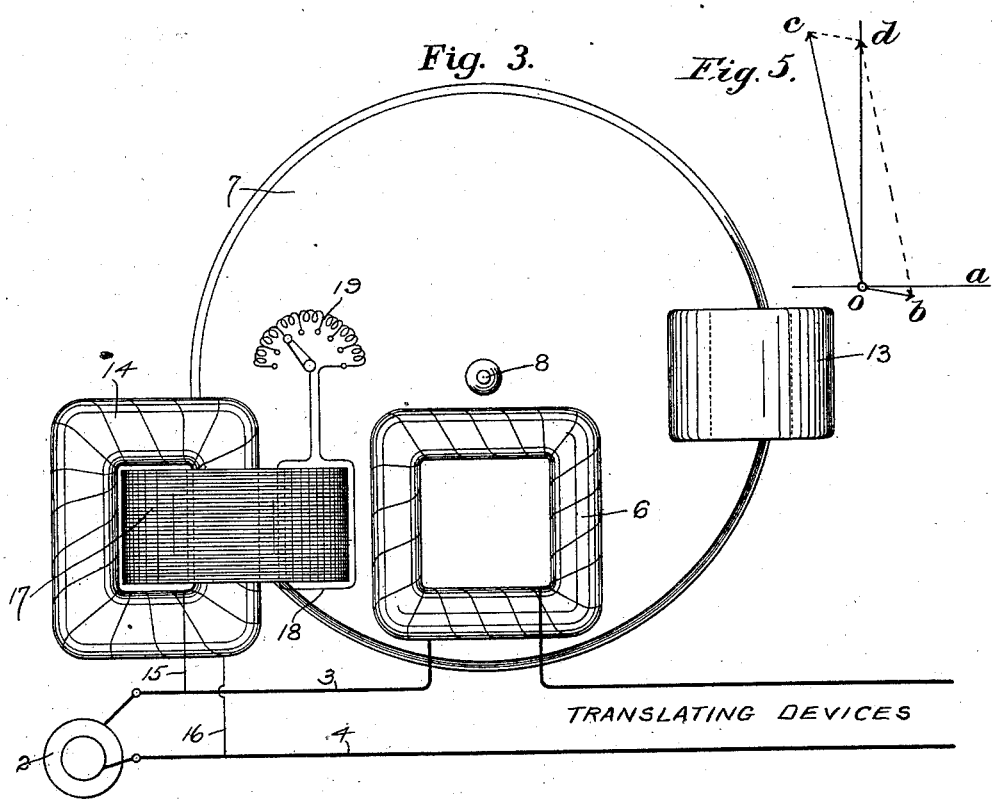
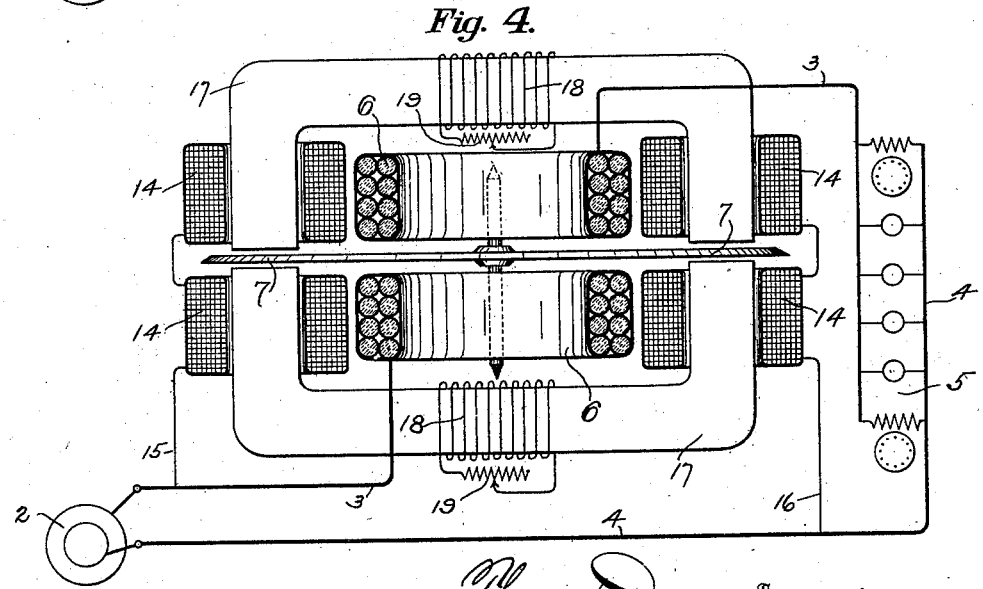
Witnesses
Samuel A. Bachtel.
Adelaide Kearns.
Thomas Duncan Inventor
By his Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,643, dated April 29, 1902.

Application filed August 24, 1898. Serial No. 689,409. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

This invention relates to improvements in integrating induction motor-meters, and particularly to the class of meters employed for the measurement of lagging currents.

The object of the present invention is to provide a simple and efficient type of meter that will measure both inductive and non-inductive loads with equal accuracy and whose cost of manufacture can be materially reduced or lessened by eliminating the impedance-coil employed in other meters of this class.

In induction-wattmeters it is a common practice to employ an impedance-coil as an extra or auxiliary element in series with the shunt or volt field-coil to produce a lag of the current through the said volt field-coil to as near ninety degrees behind the electromotive as is possible to enable the meter to measure inductive loads. In the present improvement I have dispensed with the impedance-coil and so constructed the volt field-coil that it performs the usual functions of both the impedance and volt coils—*i. e.*, it produces a magnetic field that is lagging ninety degrees or is in quadrature with the electromotive force which it represents.

It is now well understood in the art that an induction-wattmeter must have the magnetism which represents the pressure lagging behind said pressure by ninety degrees to enable the torque to be proportional to the real or true energy, and it need not, therefore, be described in detail.

In the accompanying drawings similar reference-numerals indicate like parts.

Figure 1:
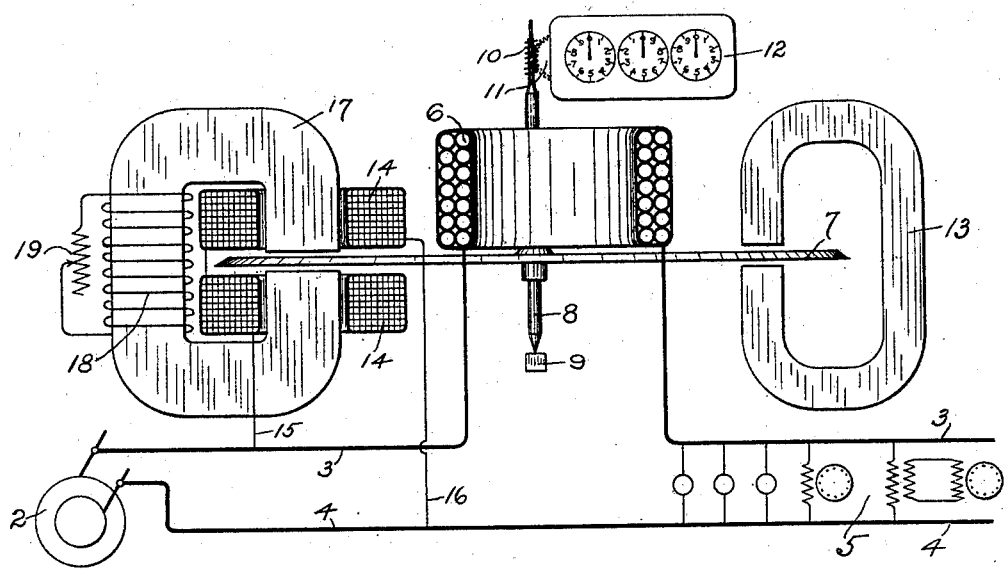
Figure 2:
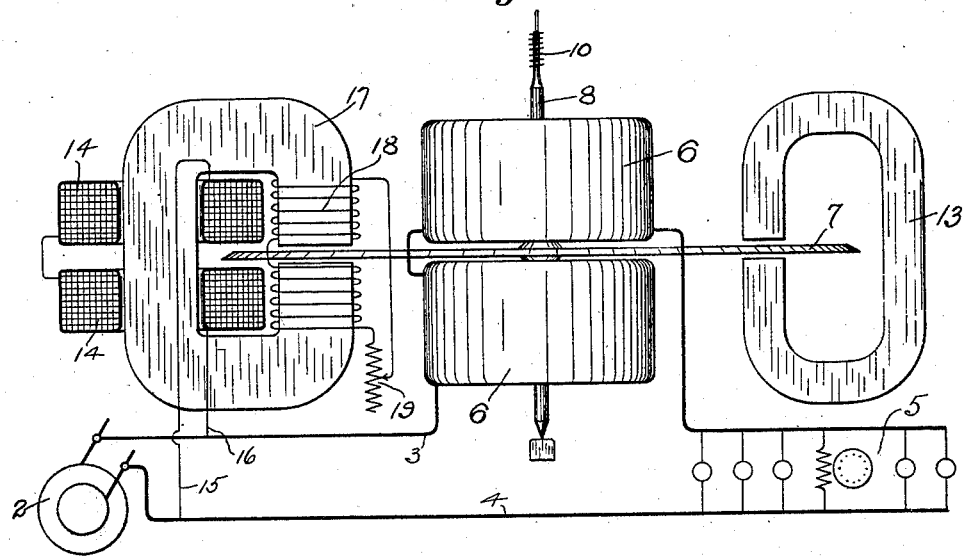

Figure 1 is a view in elevation of one form of my improvement with the series coil and volt-coils shown in vertical central section. Fig. 2 is a similar view showing two series coils arranged upon opposite sides of the armature and also showing a modified arrangement of the volt-coils, which are shown in vertical section. Fig. 3 is a plan view of one form of my improvement, showing the relative position of the series coil, volt-coil, and core and the retarding-magnet. Fig. 4 illustrates another modified arrangement, being an efficient form in which two volt-coil cores are employed with their magnetizing-coils, and the series coils are shown in vertical section. Fig. 5 is a vector diagram for illustrating the electrical principles involved.

In my improvement I employ the following elements: a source of alternating currents 2, a series coil or coils 6, volt-coils 14, a laminated iron core 17, a retarding-coil 19 for lagging the phase of the magnetism which traverses the said core 17, a variable resistance in series with the said retarding-coil, an aluminium disk armature 7, mounted upon a supporting-spindle 8, a permanent magnet 13, a step or jewel supporting said spindle, and a suitable registering mechanism 12.

In a former application, filed by me on the 9th day of August, Serial No. 688,163, I have shown and described a form of motor-meter in which the impedance-coil as a separate or distinct element is eliminated and which differs from the present application in this, that in said application the requisite phase angle of ninety degrees is obtained by utilizing the reluctance and hysteresis of a solid magnetic core in coöperative relation with a suitable volt coil or coils, whereas in the present improvement I employ a laminated iron core having the least possible reluctance and hysteresis in coöperation with a volt coil or coils and an additional or auxiliary coil mounted upon the said laminated iron core for lagging or retarding its magnetism to ninety degrees.

In describing the improvement with reference to Fig. 1 the series coil 6 is placed in the main line 3 and is traversed by the current supplied to the translating devices 5 from the generator 2 by means of the circuit leads or mains 3 and 4. The magnetism of the coil 6 will vary in strength and phase angle with the current supplied to the translating devices 5. A revoluble aluminium disk armature 7 is suitably mounted upon a spindle 8 and in inductive relation to the series coil 6. To produce a magnetic field that is representative of the electromotive force of the mains 3 and 4 and lagging ninety degrees behind the same, I employ the laminated iron core 17 and mount in any convenient manner thereon the volt-coils 14, adapted to receive current from the mains in shunt or multiple by means of the wires 15 and 16. The current through the coils 14, however, cannot lag ninety degrees on account of their ohmic resistance, and since the magnetism is approximately in phase with the current through the coils 14 it must also be less than ninety degrees; but to obtain this desired lag of ninety degrees or quadrature I employ a retarding-coil 18 to lag or retard the passage or phase of the magnetism through the core 17.

If the impedance of the volt-coils 14 is sufficient to lag the current and magnetism, say, eighty degrees, the requisite ninety degrees is obtained by adjusting the resistance 19 in series with the retarding-coil 18.

The revoluble disk armature is actuated by the shifting magnetic field that is established by the combining of the lines of force of the coil 6 and the core 17 into a common resultant, and thereby exerting a torque that is proportional to the real watts or amperes × volts × cosine of the angle of lag between the current and electromotive force.

To enable the speed of the meter to be proportional to the torque and watts, a permanent magnet 13 is so arranged as to embrace between its poles the revoluble disk armature in a well-understood manner.

In calibrating the meter the resistance 19 is decreased if the speed is slow on inductive loads, and if found to be running too fast on lagging currents the resistance 19 is increased.

The use of a closed secondary circuit, such as the coil 18, in conjunction with another magnetizing-coil for the purpose of retarding or lagging the phase of magnetism of the said magnetizing-coil, has been in use for a number of years. I therefore do not claim such a construction broadly, but simply in combination with a combined impedance-coil and volt-coil to reduce the cost of meters and still enable them to accurately measure inductive loads.

The laminated iron core 17 is shown as resembling the letter C in form; but any other form may be employed that will assist in giving a good impedance and conform to the varied tastes of designers or constructors. This core has an opening or gap upon one side of sufficient width to admit of the armature 9 without contact therewith.

The revolutions of the armature are communicated to the registering-train 12 by means of the spindle 8, worm 10, and worm-wheel 11 in the usual manner.

Fig. 2 shows the employment of two series coils 6 and shows the retarding-coils 18 mounted or wound upon the poles of the core 17.

In Fig. 3 is shown a variable rheostat or resistance 19 for regulating the phase of the magnetism through the core 17, as set forth.

In Fig. 4 is shown a very efficient form of my improvement, in which two volt-coil cores 17 are used, with their energizing volt-coils 14, four in number, wound thereon and two series field-coils 6 arranged upon opposite sides of the revoluble armature. To adjust the phase of the magnetism through the cores 17, a lagging-coil 18 is shown arranged upon each core. The coil 18 can be adjusted separately or may be connected in series. The latter connection is not shown in the drawings, as it is one that would readily suggest itself to any one versed in the art.

In Fig. 5 I have shown by vector diagram the various phase positions of the current and pressures involved. The line $oa$ represents the direction of the impressed electromotive force, the line $oc$ represents the current flowing in the coil 14, the line $ob$ represents the current flowing in the coil 18, and the two components $ob$ and $oc$ combine to form a resultant current $od$, which represents in magnitude the impressed pressure, but is displaced therefrom ninety degrees, due to the auxiliary phase-changing devices employed. The line $od$ is in quadrature with the impressed pressure $oa$.

What I desire to secure by Letters Patent is—

1. The combination in an induction motor-meter of a series field-coil; a combined pressure magnetic field and impedance device comprising a laminated iron core with a low-reluctance air-gap and magnetizing-coils mounted upon both sides of said air-gap and upon the adjacent poles of said iron core forming said air-gap; a metallic disk armature revoluble between the poles of and in the air-gap of said iron core; a secondary circuit receiving currents by induction from the said combined pressure magnetic field and impedance device; a variable resistance in series with said secondary circuit; a retarding magnetic field governing the revolutions of said armature; and means for registering the revolutions of said armature.

2. The combination in an induction motor-meter, of a combined pressure magnetic field and impedance device provided with magnetizing-coils mounted thereon, a revoluble armature inductively associated with said device, a secondary circuit receiving current by induction from said device, means for varying the current in said secondary circuit, series field-coils also inductively associated with said revoluble armature, the magnetic influence of said series field-coils and said pressure magnetic field-coils acting upon the armature in different areas, substantially as described.

3. The combination in an induction motor-meter, of series field-coils, a combined pressure magnetic field and impedance device, provided with magnetizing-coils mounted thereon, a revoluble armature inductively associated with said device and said series field-coils, a secondary circuit receiving current by induction from said device, a variable resistance in circuit with said secondary circuit, and a retarding magnetic field governing the revolutions of said armature, the said series field-coils and said combined pressure magnetic field-coils acting upon the armature in different areas, substantially as described.

4. The combination in an induction motor-meter, of series field-coils, a combined pressure magnetic field and impedance device comprising an iron core with a low-reluctance air-gap, provided with magnetizing-coils mounted thereon, a revoluble armature inductively associated with said device and said series field-coils, a secondary circuit receiving current by induction from said device, a variable resistance in circuit with said secondary circuit, and a retarding magnetic field governing the revolutions of said armature, the said series field-coils and said combined pressure magnetic field-coils acting upon the armature in different areas, substantially as described.

Signed by me at Fort Wayne, in the county of Allen and the State of Indiana, this 22d day of August, A. D. 1898.

THOMAS DUNCAN.

Witnesses:
ADELAIDE KEARNS,
WATTS P. DENNY.